United States Patent
Jakobsson

(10) Patent No.: US 11,526,886 B1
(45) Date of Patent: *Dec. 13, 2022

(54) METHOD, MEDIUM, AND SYSTEM FOR REDUCING FRAUD

(71) Applicant: RightQuestion, LLC, Portola Valley, CA (US)

(72) Inventor: Bjorn Markus Jakobsson, Portola Valley, CA (US)

(73) Assignee: RightQuestion, LLC, Portola Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/893,237

(22) Filed: Jun. 4, 2020

Related U.S. Application Data

(63) Continuation of application No. 15/948,744, filed on Apr. 9, 2018, now Pat. No. 10,713,656, which is a continuation of application No. 13/875,245, filed on May 1, 2013, now Pat. No. 9,972,010, which is a continuation of application No. 13/099,981, filed on May 3, 2011, now Pat. No. 8,458,041.

(60) Provisional application No. 61/332,140, filed on May 6, 2010.

(51) Int. Cl.
  *G06Q 30/00* (2012.01)
  *G06Q 20/40* (2012.01)
  *G06Q 30/06* (2012.01)

(52) U.S. Cl.
  CPC ... *G06Q 20/4014* (2013.01); *G06Q 20/40145* (2013.01); *G06Q 30/06* (2013.01)

(58) Field of Classification Search
  CPC ......... G06Q 20/4014; G06Q 20/40145; G06Q 30/06; G06Q 30/0641–0643
  See application file for complete search history.

(56) References Cited

U.S. PATENT DOCUMENTS

| | | |
|---|---|---|
| 5,428,734 A | 6/1995 | Haynes |
| 6,091,835 A | 7/2000 | Smithies |
| 6,208,659 B1 | 3/2001 | Govindarajan |
| 6,851,094 B1 | 2/2005 | Robertson |
| 7,930,220 B1 | 4/2011 | Gaw |
| 2001/0026632 A1 | 10/2001 | Tamai |
| 2001/0042042 A1 | 11/2001 | Stokes |
| 2002/0046055 A1 | 4/2002 | Martino |
| 2002/0116293 A1 | 8/2002 | Lao |

(Continued)

OTHER PUBLICATIONS

Reddy, P. Venkata, et al. "A new antispoofing approach for biometric devices." IEEE transactions on biomedical circuits and systems 2.4 (2008): 328-337. (Year: 2008).*

(Continued)

*Primary Examiner* — Matthew E Zimmerman
(74) *Attorney, Agent, or Firm* — Van Pelt, Yi & James LLP

(57) ABSTRACT

Techniques for reducing fraud are disclosed. A transaction request is received from a user to perform a transaction using an account. In one approach, a source icon is displayed prior to executing the request. The source icon includes a graphical representation of an owner of the account. In another approach, at least one of a photograph and a voice of the user is recorded prior to executing the request. In a third approach, the user is informed that at least one of a photograph, a voice print, and location data will be taken prior to executing the transaction request.

23 Claims, 12 Drawing Sheets

(56) References Cited

U.S. PATENT DOCUMENTS

| | | | |
|---|---|---|---|
| 2002/0130764 A1* | 9/2002 | Hayakawa | G06F 21/32 |
| | | | 340/5.82 |
| 2002/0152137 A1 | 10/2002 | Lindquist | |
| 2003/0037264 A1* | 2/2003 | Ezaki | G06F 21/32 |
| | | | 726/21 |
| 2004/0254855 A1 | 12/2004 | Shah | |
| 2005/0049981 A1 | 3/2005 | Mixon | |
| 2005/0187883 A1 | 8/2005 | Bishop | |
| 2005/0197922 A1 | 9/2005 | Pezaris | |
| 2007/0233614 A1 | 10/2007 | McNelley | |
| 2008/0040426 A1 | 2/2008 | Synstelien | |
| 2009/0013359 A1 | 1/2009 | Butler | |
| 2009/0171810 A1 | 7/2009 | Mengerink | |
| 2009/0288012 A1* | 11/2009 | Hertel | G06Q 20/326 |
| | | | 715/738 |
| 2009/0288015 A1 | 11/2009 | Fujioka | |
| 2011/0112931 A1 | 5/2011 | Hu | |
| 2012/0110341 A1 | 5/2012 | Beigi | |

OTHER PUBLICATIONS

Art Explosion, Nova Development 2002.
Boukhonine et al., Future Security Approaches and Biometrics, Communications of the Association for Information Systems, Dec. 2005, pp. 937-966, vol. 16.
Mittapelli, Chaitanya Reddy. Online shopping. Diss. Kansas State University, 2008.
Sengottuvelan, P. and A. Wahi. "Analysis of Living and Dead Finger Impression Identification for Biometric Application." Conference on Computational Intelligence and Multimedia Applications, 2007. International Conference on vol. 2. IEEE, 2007.

\* cited by examiner

METHOD, MEDIUM, AND SYSTEM FOR REDUCING FRAUD

CROSS REFERENCE TO OTHER APPLICATIONS

This application is a continuation of co-pending U.S. patent application Ser. No. 15/948,744 entitled METHOD, MEDIUM, AND SYSTEM FOR REDUCING FRAUD filed Apr. 9, 2018, which is incorporated herein by reference for all purposes, which is a continuation of U.S. patent application Ser. No. 13/875,245 entitled METHOD, MEDIUM, AND SYSTEM FOR REDUCING FRAUD filed May 1, 2013, now U.S. Pat. No. 9,972,010, which is incorporated herein by reference for all purposes, which is a continuation of U.S. patent application Ser. No. 13/099,981 entitled METHOD, MEDIUM, AND SYSTEM FOR REDUCING FRAUD BY INCREASING GUILT DURING A PURCHASE TRANSACTION filed May 3, 2011, now U.S. Pat. No. 8,458,041, which is incorporated herein by reference for all purposes, which claims priority to U.S. Provisional Patent Application No. 61/332,140 entitled REDUCING FRAUD filed May 6, 2010 which is incorporated herein by reference for all purposes.

BACKGROUND OF THE INVENTION

Fraudulent transactions are an ongoing problem. One way fraud is committed is by one individual stealing another individual's credit card and using that stolen card to perform transactions at physical locations, such as to purchase gasoline or groceries. Fraud can also be perpetrated in the context of electronic transactions. Electronic fraud can be particularly devastating because the perpetrator does not need physical access to a victim's credit card (or other resource) to perform the fraud. Improved techniques to prevent fraud would be useful. Improved techniques to identify those who commit fraud would also be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
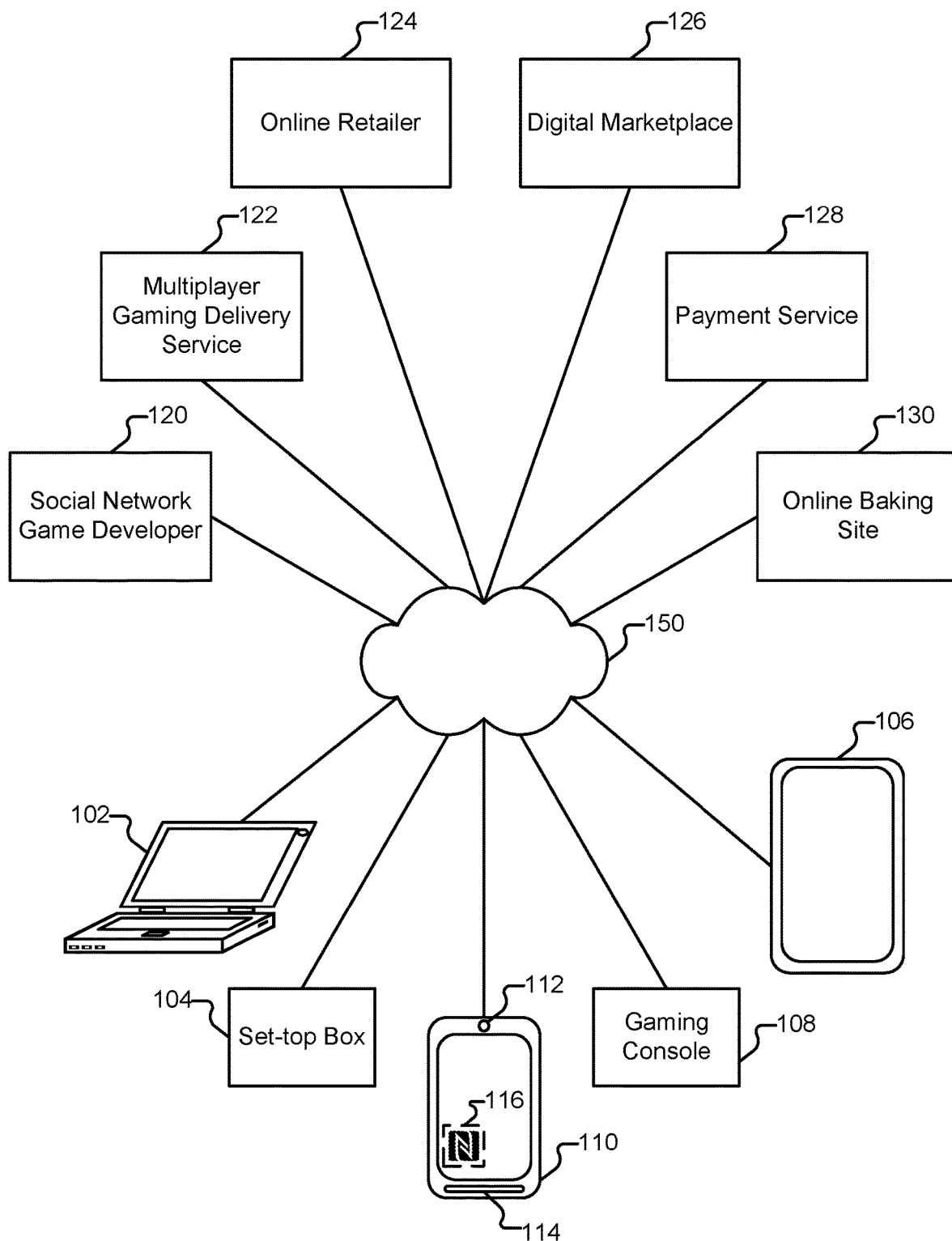
FIG. 1 illustrates an example of an environment in which fraudulent transactions can occur.

FIG. 1 illustrates an example of an environment in which fraudulent transactions can occur. The techniques described herein can be used with devices and services that are not protected by passwords, or where passwords are commonly shared. They can be implemented by web services, using JavaScript (or similar technology). They can also be implemented as browser extensions and dedicated software installed on the appropriate device.

As used herein, "fraudulent" transactions include both prosecutable criminal actions and actions which might not warrant criminal action but where a person nonetheless loses something of value without providing informed consent. As shown, users of clients 102-110 engage in transactions involving various service providers 120-130 via one or more networks (represented herein as a single network cloud 150). In several of the examples described below, traditional protections against fraudulent activities are either disabled (e.g., by a given site not requiring a password due to a stored cookie, or the password being supplied automatically by a browser) or rendered moot (e.g., by a given user sharing a password with another user). Examples of both legitimate and fraudulent transactions involving clients 102-110 and providers 120-130 are as follows:

Example (1)

Legitimate: The owner of laptop 102 purchases books and movies from online retailer 124 via a browser application installed on client 102. The laptop owner is typically not challenged to provide a password at checkout time because of cookies stored on the laptop or because retailer 124 otherwise recognizes laptop 102. Fraudulent: A family member of the laptop owner purchases a magazine from retailer 124, using laptop 102, without the laptop owner's permission.

Example (2)

Legitimate: Set-top box 104 is connected to a television and used to rent digital copies of movies from digital marketplace 126. Stored within set-top box 104 is the credit card information of the individual renting the movies. Fraudulent: A roommate of the individual uses device 104 to rent a movie without the individual's permission.

Example (3)

Legitimate: The owner of tablet 106 uses online banking site 130 to manage various bank accounts, transfer money between accounts, and to pay bills. The owner of tablet 106 also uses payment service 128 to send electronic payments for items won at an online auction site. Fraudulent: The spouse of the tablet owner uses the tablet to pay personal bills using a jointly held bank account (without prior agreement that such actions are acceptable) or to send payments using payment service 128 on behalf of the tablet owner without the tablet owner's permission.

Example (4)

Legitimate: Gaming console 108 is located in the living room of a family with two boys and is in communication with multiplayer gaming delivery service 122, which allows players to collaborate in multiplayer games and to trade virtual goods with one another. The boys each have accounts on gaming console 108 and with gaming delivery service 122 and play games using gaming console 108. Fraudulent: The first brother accesses the second brother's accounts, without his permission, and causes the second brother's game character to transfer a digital good to the first brother's game character.

Example (5)

Legitimate: The owner of telephony device 110 is a mother, with a daughter that does not have a telephony device of her own. The mother allows the daughter to use device 110 to play a game produced by social network game developer 120. Developer 120 sells digital goods that can be used within the games it produces. Fraudulent: The mother has explicitly told the daughter that the daughter may not purchase digital goods from the game developer. The daughter ignores her mother's instructions and purchases digital goods using device 110. Another example of a fraudulent transaction is where the daughter uses device 110 to send a premium SMS (e.g., to contribute money to a disaster relief fund) or to download for-pay applications from digital marketplace 126 without her mother's permission.

Example (6)

Legitimate: Telephony device 110 includes typical components such as a CPU, RAM, a front facing camera 112, and a microphone 114. Telephony device 110 also includes a near field communication ("NFC") chip 116. The owner of telephony device 110 uses NFC chip 116 as a payment method for items such as lunch and cups of coffee at a café that supports NFC transactions. The owner of the device has the device configured to automatically unlock when it is within a certain distance from home and work. The café is within the area defined as "work" and thus unlocked. Fraudulent: The owner of device 110 and a coworker visit the café for lunch. On their way out of the café, the owner of device 110 leaves her purse (and device 110) on the table to visit the restroom. The coworker would like to buy a pack of gum from the café cashier but realizes that he has left his wallet at the office. The coworker pays for the gum using the NFC capabilities of device 110, without the owner's knowledge.

In each of the above examples of fraudulent transactions, the would-be perpetrators (also referred to herein as "fraudsters") are family members, friends, colleagues, or persons that otherwise have some personal relation with the victim. These fraudsters are probably not hardened criminals, but regular people who fall for the temptation. In some of the cases (e.g., Example 6), the fraudster may believe that they will eventually pay back the money. The fraudsters are generally people who would reject pickpocketing as immoral, and who would not take cash out of the wallet of the victim or forge checks on behalf of the victim. Yet, in each of the examples above, the otherwise honest fraudsters are nonetheless committing fraudulent transactions.

Two reasons that people refrain from committing fraudulent acts are (1) associated feelings of guilt and (2) the risk of getting caught. Thus, a daughter might refrain from taking money from her mother's purse because she would feel guilty doing so, and/or because there is a high risk of being caught, particularly if the daughter is an only child. One reason that the same daughter (e.g., as explained in Example 5 above) might fraudulently use her mother's phone to purchase digital goods (or send a premium SMS) is because the associated guilt she would feel in doing so is less than the guilt she would feel for taking money out of her mother's purse (e.g., because physical cash is a concrete, tangible item while a digital payment for a digital good is a more abstract concept). In the case of the premium SMS, the daughter might actually experience a net positive feeling for contributing to charity (albeit with money that does not belong to her). Another reason that the daughter might fraudulently use her mother's phone to purchase digital goods (or send an SMS) is that the risk of being caught is less than if she were to take money from her mother's purse. For example, the mother may have automatic payments set up for her phone bill and thus not scrutinize the line items incurred by the daughter, especially if such transactions are relatively small.

Described herein are techniques for increasing the guilt felt by fraudsters when they are about to commit a fraudulent transaction. In at least some cases, a reminder that moral implications are attached to performing a transaction will cause a fraudster to abort a fraudulent transaction. Also described herein are techniques for increasing the likelihood (either real or as perceived by the fraudster) that the fraudulent act will be detected. In both cases, the impact on legitimate transactions (either by the device/account owner, or by a person given explicit permission to perform a transaction by the device/account owner) is minimal (e.g., does not delay or complicate legitimate transactions).

The techniques for increasing guilt can also be used in situations not involving fraud, such as where the legitimate owner of a device wishes to change a legitimate (but not desirable) behavior through self-induced guilt.

Increasing Feelings of Guilt

One reason that an otherwise honest person might engage in a fraudulent transaction is that the monetary value of the transaction is abstract. The more concrete the value of a transaction is, the more guilty a fraudster might feel when perpetrating the fraud. A $20 bill, when held in a person's hand and presented to a merchant, is a tangible item with a concrete value. When the same amount of money is involved in an electronic transaction (e.g., the purchase of a book or set of magazines), the amount of money involved may seem less concrete.

Another reason that an otherwise honest person might engage in a fraudulent transaction is that the victim of the transaction is anonymous. The more human the victim is made to be, the more guilty a fraudster might feel when perpetrating the fraud. In order to take money out of her mother's purse, a daughter must confront the fact that she is taking money away from a real person (and presumably a person that she loves). Other items in the purse, such as photographs in a wallet, or a set of keys with a personalized key ring, will further reinforce that the victim is a particular individual—Mom. When the same amount of money is involved in an electronic transaction, the identity of the victim will likely be less pronounced, and may be seemingly absent, such as where the daughter sends a premium SMS with her mother's phone.

Feelings of guilt for engaging in fraudulent transactions can be increased both by making a given transaction more concrete, and by emphasizing the victim's identity. Examples of both approaches will now be presented in conjunction with the following scenario: Suppose a father ("Bob") has a son ("Bob Jr.") in college. Bob and Bob Jr. live in different cities. Bob wants to make sure that Bob Jr. has enough money for school books, and has provided Bob Jr. with his username and password for online retailer 124. Bob has specifically told Bob Jr. that it is ok for Bob Jr. to purchase schoolbooks using Bob's account with online retailer 124. Bob Jr. is generally a trustworthy individual.

As part of an enrollment process (e.g., with online retailer 124), Bob is asked to provide an image that represents himself. The enrollment process may be voluntary, may be required for new users but not required for existing users, may be imposed on users who have previously been involved in chargebacks or other questioned transactions, or as part of any other appropriate situation.

Figure 2A:
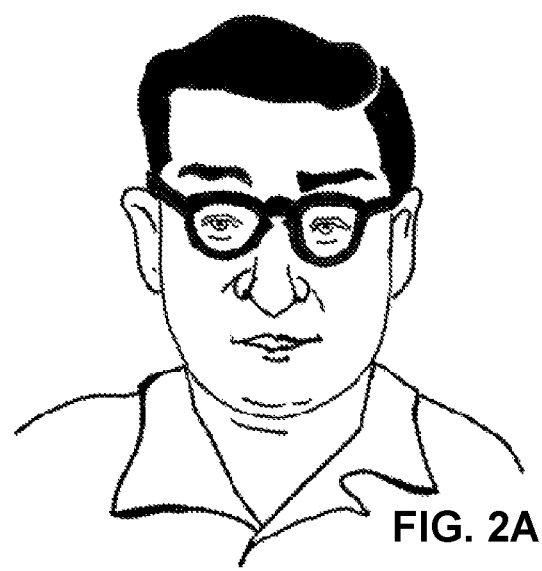
FIG. 2A illustrates an image of an individual.

An example of an image provided by Bob is illustrated in FIG. 2A. The image may be a photograph, an avatar, or other representation of Bob, either generated by Bob, selected by Bob, or automatically obtained, such as by fetching a profile photograph that Bob has selected for use with a social networking site. The image may also be of something with which Bob closely identifies, such as a favorite pet, or may be a textual representation of Bob (e.g., a logo that reads "Super Dad"). If Bob is accessing retailer 124 via a computer, he may choose to upload a JPEG or other file that is stored on his computer. If Bob is accessing retailer 124 via a telephony device with a camera (whether with a browser, a third party application, or via an application made available by retailer 124), Bob may use the telephony device's camera to provide an image.

The provided image can be manipulated, such as by tools made available by retailer 124, to enhance it or remove unnecessary details. In the example shown in FIG. 2B, automatic face recognition and cropping has been applied to the image of 2A.

Figure 2B:
FIG. 2B illustrates an image of an individual.

Bob can also provide multiple images. For example, Bob can provide an image that corresponds to a "personal" version of himself (e.g., as shown in FIG. 2A) and can also provide an image that corresponds to a "business" version of himself (e.g., as shown in FIG. 2B). In some embodiments, the additional image(s) are automatically generated, such as by a tie being automatically added to the image shown in FIG. 2B. Similarly, Bob can choose to enhance FIG. 2B by adding other accessories, such as a medieval helmet, or exaggerating features.

Figure 3:
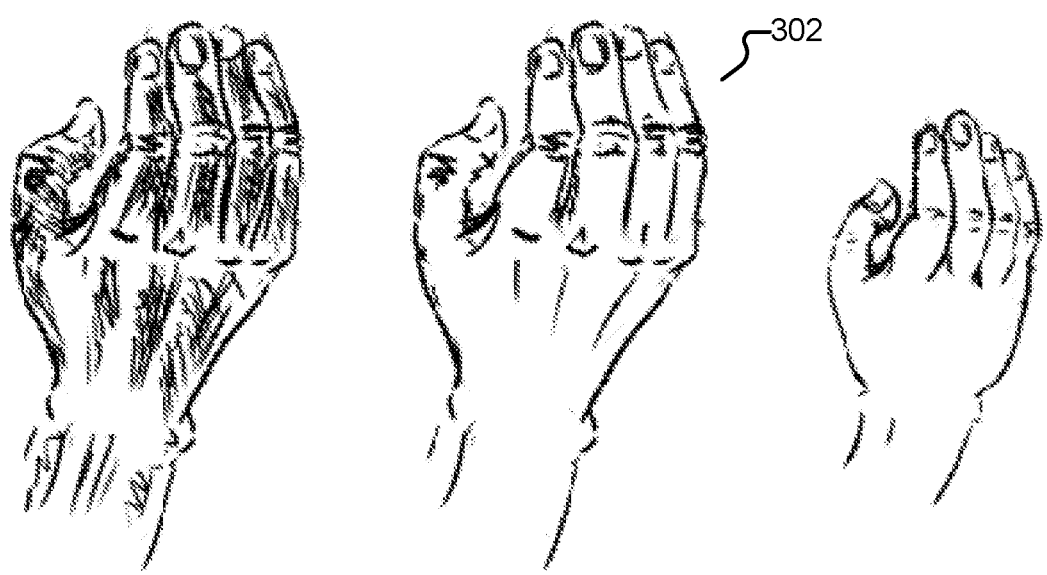
FIG. 3 illustrates a selection of hands.

Also as part of the enrollment process, Bob is asked to select an image of a hand that best matches his own hand. Bob selects hand 302 from the choices presented in FIG. 3. In some embodiments, the hand is automatically selected for Bob after analysis of his provided image.

The images selected by Bob, along with other images, such as representations of money, can be displayed at checkout time. Suppose Bob Jr. is shopping for books to help him with a calculus class he is taking. Bob Jr. has added a calculus study guide to his cart, but has also added some additional items that do not relate to his studies. Specifically, Bob Jr. has added a computer game guide and a calendar of beach parties. If Bob Jr. had been handed cash by his father "to be used for school books," Bob Jr. might have spent the money as instructed and returned the change to his father. In an online shopping environment, however, the abstract nature of the amount of money involved, as well as the reduced emphasis on the owner of the money (i.e., his dad), have tempted Bob Jr. to buy things that he should not.

Figure 4:
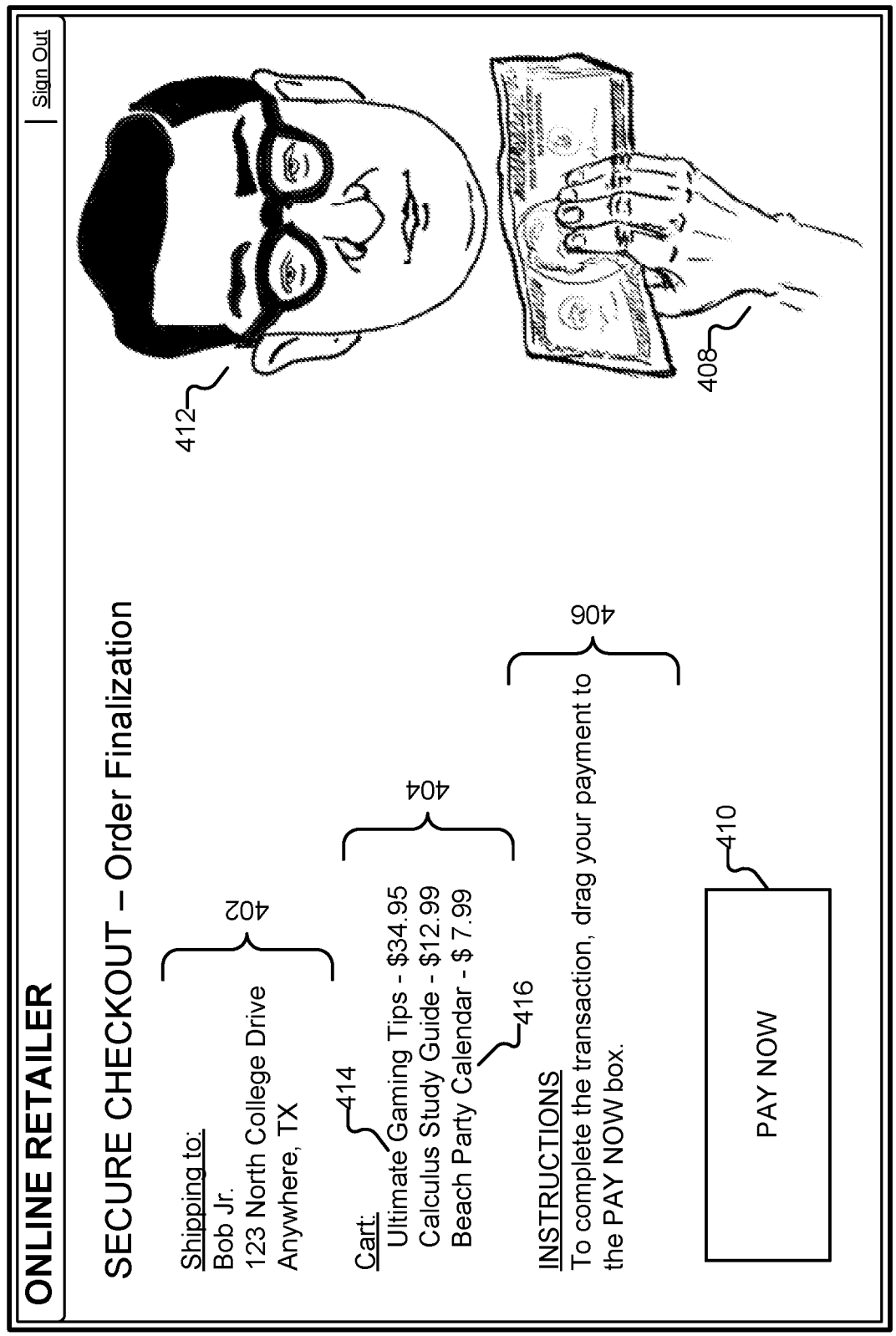
FIG. 4 illustrates an embodiment of an interface.

FIG. 4 illustrates an embodiment of an interface. The example shown is a representation of an interface, as rendered in a browser application of a personal computer, that would be shown to Bob Jr. during a checkout process. Other interfaces, such as would be displayed by device 106 or device 110 when those devices are used to contact site 124, can also be used in conjunction with the techniques described herein.

In region 402, Bob Jr.'s shipping address is shown. In region 404, the contents of Bob Jr.'s shopping cart is shown. Instructions for completing the transaction are presented in region 406. Specifically, in order to pay, Bob Jr. must click on hand 408 and drag it to region 410 of the interface. In various embodiments, such as where the interface is rendered on mobile device 110, other actions may also be taken, such as by swiping hand 408 with a finger to drag it to region 410, or speaking "pay now" or "I agree to pay" into a microphone. In the latter cases, the hand would automatically move in response to the spoken words. In addition, if the user speaks "pay now," the user's voice can be recorded and used for audit purposes described in more detail below. If the device includes a built-in finger scanner or other biometric equipment that allows the automatic capture of biometric information of the user performing the transaction, that biometric information can also be used for audit purposes, also as described in more detail below. Such biometric information may be partial (e.g., the size or shape of a fingerprint) or more complete (e.g., a fingerprint).

Also included in interface 400 is an image of Bob's face 412. To complete the transaction, Bob Jr. is dragging money away from his father and presenting it as payment for the items in his cart. If Bob himself was performing a transaction, the act of taking money away from himself would not likely cause any additional burden on the completion of the transaction. Similarly, if Bob Jr. was only purchasing the math study guide, he also would likely not be impeded in completing the transaction. However, where, as is illustrated in FIG. 4, Bob Jr. has included items in his cart for which his father has not authorized payment, having to drag the money away from his father may cause Bob Jr. to reconsider whether he wants to purchase items 414 and 416.

Figure 5A:
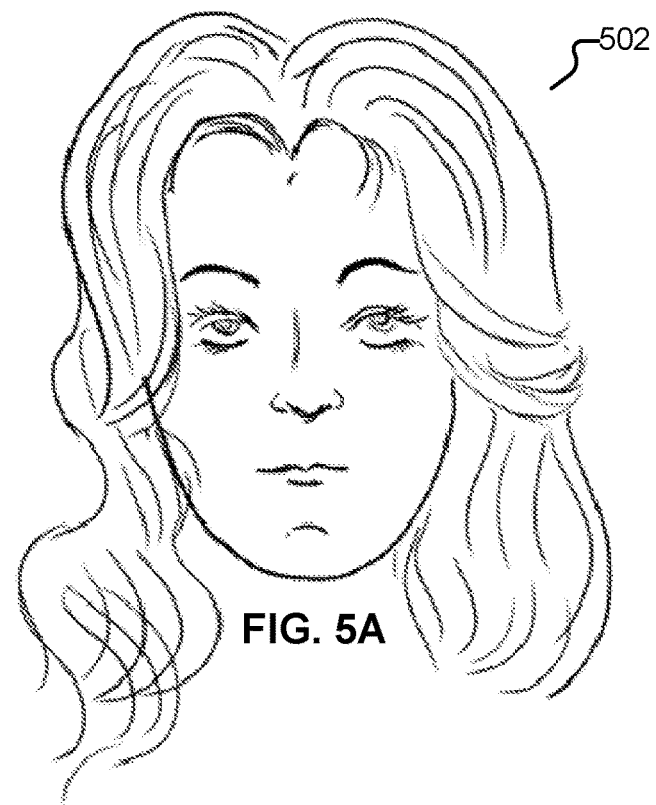
FIG. 5A illustrates an image of an individual.
Figure 5B:
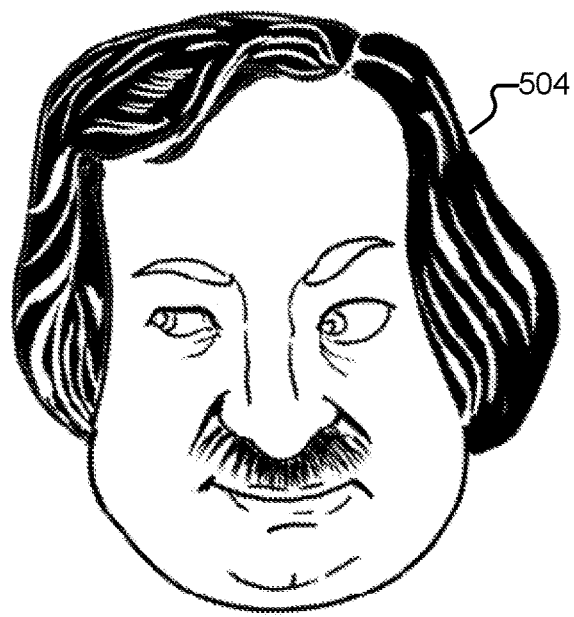
FIG. 5B illustrates an image of an individual.
Figure 5C:
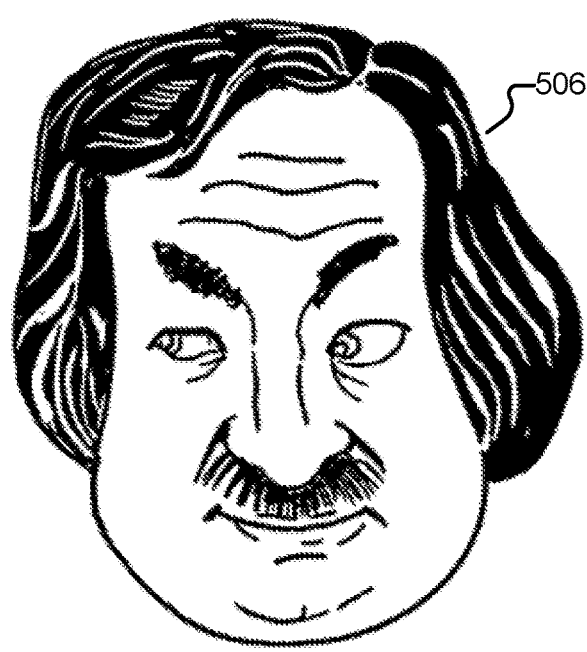
FIG. 5C illustrates an image of an individual.

FIGS. 5A-5C illustrate additional examples of images used in conjunction with the techniques described herein. FIG. 5A is an image of "Alice," the owner of telephony device 110. Installed on device 110 (either as a native feature of the operating system of the device or as a third party application) is an application that implements techniques described herein. As part of an enrollment with the application, Alice is asked to photograph herself using camera 112 and is also asked to create a short voice sample. Both pieces of data are stored on device 110 and, in some embodiments, are not transmitted beyond the phone.

FIGS. 5B and 5C are two images provided by Charlie, an owner of tablet device 106. Specifically, FIG. 5C represents an "upset" version of Charlie—his eyebrows are raised and his brow is furrowed. Suppose Charlie has given tablet device 106 to his daughter on the condition that she does not spend more than $10/month on applications for it. The tablet is configured to charge Charlie's credit card or to append charges to Charlie's phone bill, as applicable. Each time his daughter buys an application, up to the $10 total amount, she will be shown the image illustrated in FIG. 5A as part of the purchase process (e.g., as a reminder that her dad has set a spending policy). Suppose Charlie's daughter has already spent $9.50 for a given month, and is about to purchase an additional application costing $5. This time, as part of the purchase process, instead of being presented with the image shown in FIG. 5B, she is shown image 506—indicating that her father will be unhappy if she completes the transaction. In various embodiments, an animation of the transition from image 504 to image 506 is automatically generated and presented to Charlie's daughter. If Charlie himself makes the purchase, or if his daughter has asked permission to exceed the $10/month limit, being presented with FIG. 5C will not hinder the transaction, because Charlie will not in fact be upset by the transaction. However, if no such authorization has been given, Charlie's daughter might reconsider completing the purchase—either asking Charlie if it is ok to exceed the amount, or waiting until next month to buy the application.

Detecting Fraud

One reason that an otherwise honest person might engage in a fraudulent transaction is that the risk of being caught is low. As one example, an employee might take for personal use items such as pens or staplers from a supply closet if no one else is present at the time. However, if the employee's boss was also present in the supply closet, the employee would likely not be tempted to take the items. In the case of transactions such as where Alice's daughter buys digital goods without Alice's permission, or sends a premium SMS, the risk that Alice will notice any individual transgression is low—particularly if Alice has automatic payments set up for her phone bills.

Described herein are techniques for both increasing the likelihood that fraudulent transactions will be detected, and for causing a fraudster to believe that his or her fraudulent transactions will be detected (irrespective of whether such a detection actually takes place).

Figure 6:
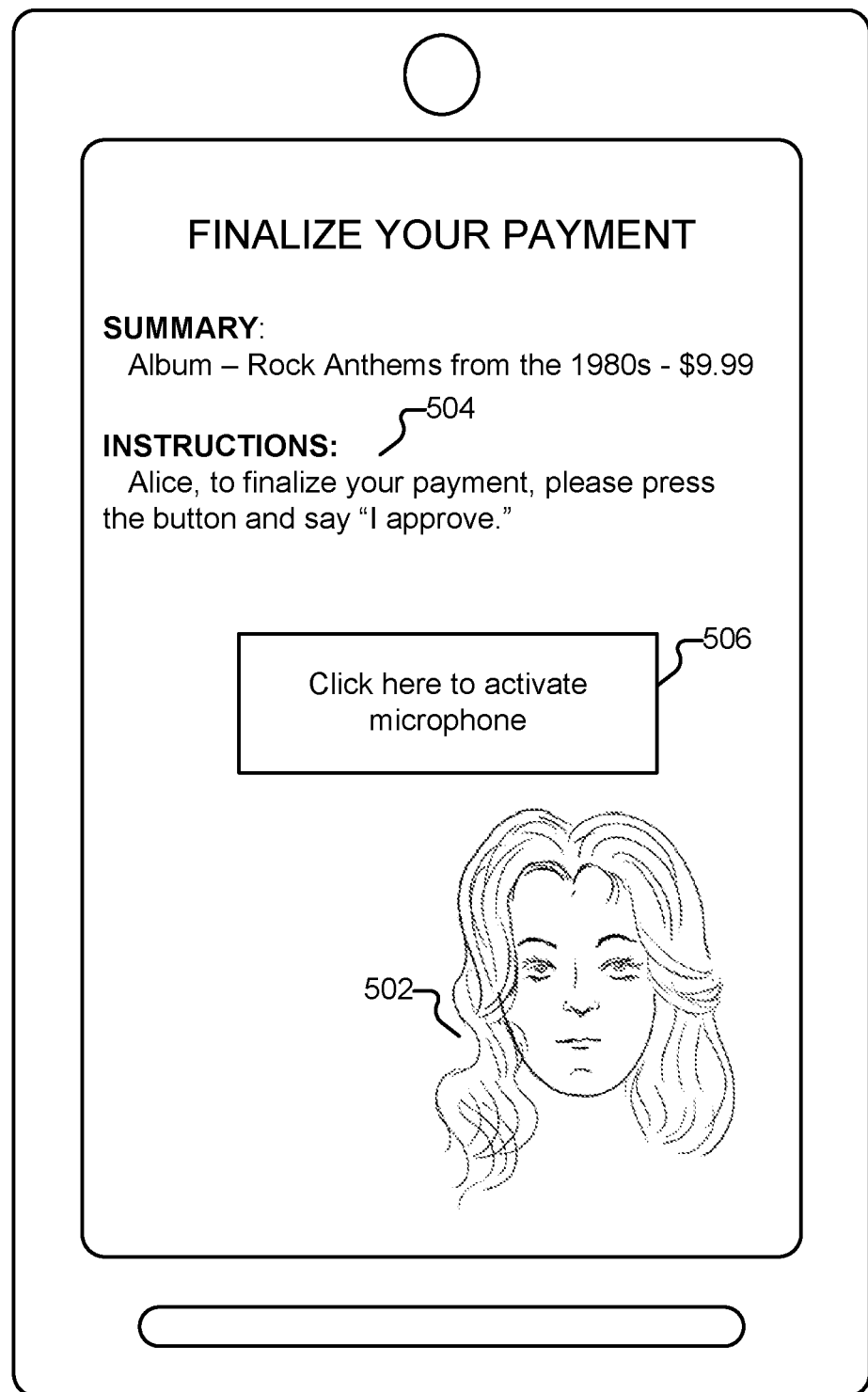
FIG. 6 illustrates an embodiment of an interface.

FIG. 6 illustrates an embodiment of an interface. Suppose Alice would like to purchase digital music using device 110. As part of the checkout process, Alice is presented with the interface shown (as rendered on device 110). As mentioned in conjunction with the discussion of FIG. 5A, as part of an enrollment process, Alice was asked to photograph herself, and to provide a short voice sample. As part of the checkout process, Alice is shown the image she provided at registration (502). The checkout process is personalized, providing instructions (504) for Alice (by name) on how to complete the transaction. Specifically, Alice is asked to click on box 506 to activate the microphone 112 of device 110. She will then be asked to repeat the phrase she selected at registration, asked to state a particular word or set of words appearing on the screen (such as "I agree" or an arbitrary string), or otherwise provide an audio recording.

A variety of actions can be taken in response to the providing of audio input via microphone 112. In some embodiments, the recorded audio is immediately played back to the purchaser, along with a message, such as, "If you would still like to proceed, press 1." In some embodiments, analysis is performed within device 110 to determine whether the previously recorded voice and the currently supplied voice are the same. If the voice is a sufficient match (e.g., as determined by a Fast Fourier Transform or other appropriate technique), the transaction is allowed to proceed. If the voice is not a match within some tolerance, the voice can be stored for a period of time (e.g., in case a dispute arises), an alert can be sent to Alice, an alert can be sent to a carrier, and/or other appropriate actions can be taken. In some embodiments, the analysis is provided by a third party, such as the owner of digital marketplace 126. Finally, in some embodiments, no actions are taken with respect to the currently supplied voice—the instructions provided in 504 serve as a deterrent against fraudulent activity because a fraudster will erroneously believe, based on the instructions, that he or she will be caught and will not complete the transaction. Uploading voice samples (or creating them for on-device use) can also serve as a substitute or addition to uploading images (or creating them for on-device use). For example, a user can record his or her voice saying, "This is my money," to be played when a payment is about to be performed. The actual owner of the money will not be deterred by hearing this recording, nor will a user with permission, but a user without permission will be reminded of this fact. Similarly, a short movie of the device or account owner can be used instead of an image or a voice sample, or in addition to these.

As the owner of device 110 making a legitimate transaction, interacting with the interface shown in FIG. 6 will provide a minimal intrusion on Alice's ability to purchase digital music. Similarly, if Alice's daughter is purchasing the album, with Alice's permission, Alice's daughter will not feel guilty when confronting image 502 and need not be concerned that the voice sample she provides will implicate her in any wrongdoing, because she has Alice's explicit permission to make the purchase. However, in the event Alice's daughter is purchasing music on device 110 without Alice's permission, her experience will be different. Specifically, Alice's daughter may feel guilt after seeing her mother's image, and/or will be deterred from making the purchase with the belief that her mother will be alerted that her daughter has made an unauthorized purchase.

Figure 7:
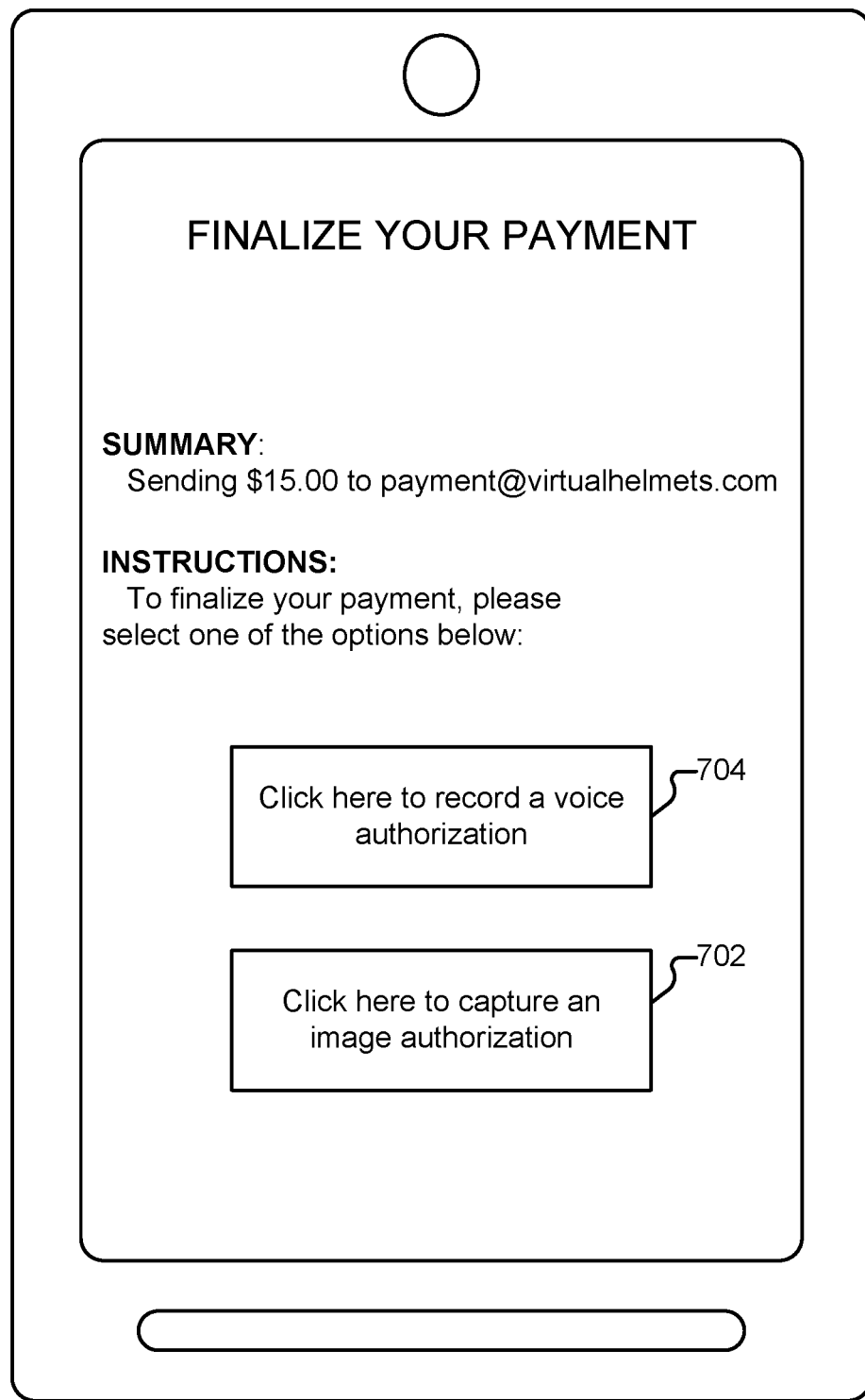
FIG. 7 illustrates an embodiment of an interface.

FIG. 7 illustrates an embodiment of an interface. The example shown is an alternate embodiment of the interface shown in FIG. 6. In this example, to complete a transaction for digital goods (e.g., with social network game developer 120), the purchaser is given a choice of either providing an audio sample (by selecting box 704), or providing a photograph (by selecting box 702). If the purchaser selects box 702, the purchaser will be asked to photograph himself or otherwise provide a form of photographic authorization.

In some embodiments, an analysis of the photograph is performed as part of the transaction. Techniques for confirming that the object being photographed is alive (e.g., by taking multiple photographs in rapid succession) can be employed to help make sure that the fraudster isn't using camera 112 to photograph a printed picture of the legitimate user. The application of various rules, such as requiring that a face be detected in the captured image or that a certain amount of flesh tone be present in the picture can also be implemented. Similar rules can be applied to other types of capture, such as requiring that a GPS be turned on prior to a transaction taking place, or requiring that provided audio conform to general rules that define what human utterances sound like.

The photograph can be stored (either on the device or with a party such as a carrier or with site 120) for some period of time in case a dispute arises. In various embodiments, no action is taken, but a fraudulent purchaser will be lead to believe that they will be caught if they engage in a fraudulent transaction. Other contextual information can also be captured (or threatened to be captured) and analyzed, if applicable. As one example, a would-be purchaser can be warned that their location will be captured as part of the transaction. As another example, the purchaser can be asked to write out "I agree" or "I want to pay Bob," and the handwriting sample is recorded. As yet another example, the size of a finger involved in a touchscreen action can be recorded (e.g., to indicate whether it was a child's finger or an adult's finger), and if the device is appropriately equipped, a fingerprint of the user can be captured. In the case of a fingerprint, the device may not be capable of capturing a fingerprint, but a would-be fraudster can be dissuaded from committing fraud by being informed that the touch screen of the device is capable of capturing the fingerprint.

Alerts can be generated if the captured contextual information does not comport with what would be expected. For example, a user could specify that if transactions are performed by a small finger (e.g., a child's), the device owner should be alerted. As another example, the device owner can specify that an alert should be generated whenever transactions are made in locations other than the user's home or office. The alerts may be sent to the implicated device (e.g., as an SMS or as a popup box), but can also be sent to an alternate location, such as to an email address specified by the owner. In some embodiments, the generated alert includes the captured contextual information. For example, if a voice is captured, a copy of the audio recording could be emailed to the owner of the device whenever the audio recording is determined to not match a sample previously provided by the device owner.

In the scenario where captured contextual information is sent off of a device, e.g., to a carrier or to social network game developer 120, the quality of the information collected need not be of a nature sufficient to mount a criminal case. Even rudimentary contextual information can be useful in resolving whether a charge that is claimed by a device owner to have been made without his consent was made by an unknown criminal, the owner himself, or a person known to the owner.

Figure 8:
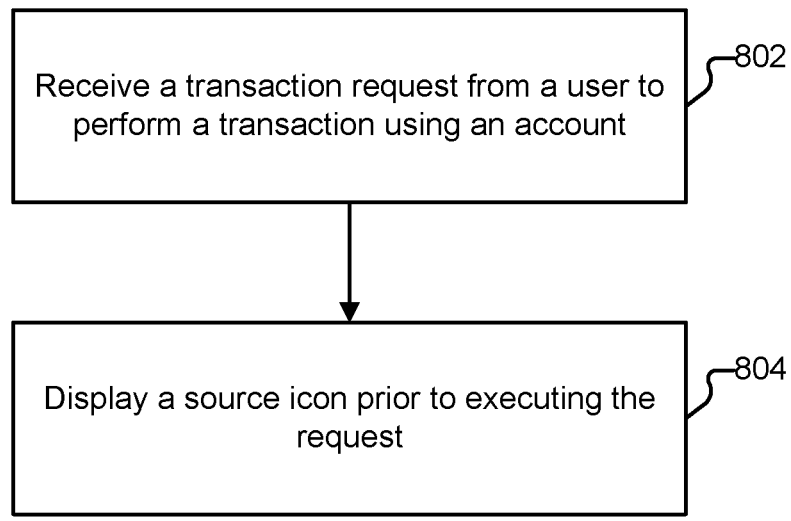
FIG. 8 illustrates an embodiment of a process for reducing fraud.

FIG. 8 illustrates an embodiment of a process for reducing fraud. In some embodiments, the process shown in FIG. 8 is performed on a device such as device 110. In other embodiments, the process shown in FIG. 8 is performed at least in part on a server, such as a server providing an interface to a site of online retailer 124. The process begins at 802 when a request to perform a transaction using an account is received from a user. As one example, at 802, Bob Jr. has selected a "checkout" button in an interface provided by online retailer 124 after adding various items to a shopping cart. At 804, a source icon is displayed prior to executing the request. As one example, at 804, Bob Jr. is presented with face 412.

Figure 9:
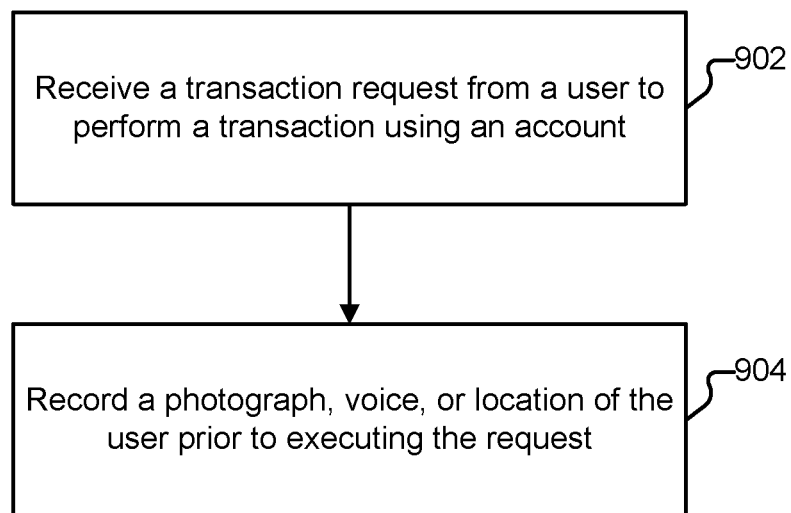
FIG. 9 illustrates an embodiment of a process for reducing fraud.

FIG. 9 illustrates an embodiment of a process for reducing fraud. In some embodiments, the process shown in FIG. 9 is performed on a device such as device 110. The process begins at 902 when a request to perform a transaction using an account is received from a user. As one example, at 902, Alice has selected a "buy now" icon in an interface rendered on device 110. At 904, at least one of a photograph, a movie, a voice, and a location of the user is recorded prior to executing the request. As one example, at 904, Alice's voice is recorded after she activates the microphone of device 110 by selecting box 506.

Figure 10:
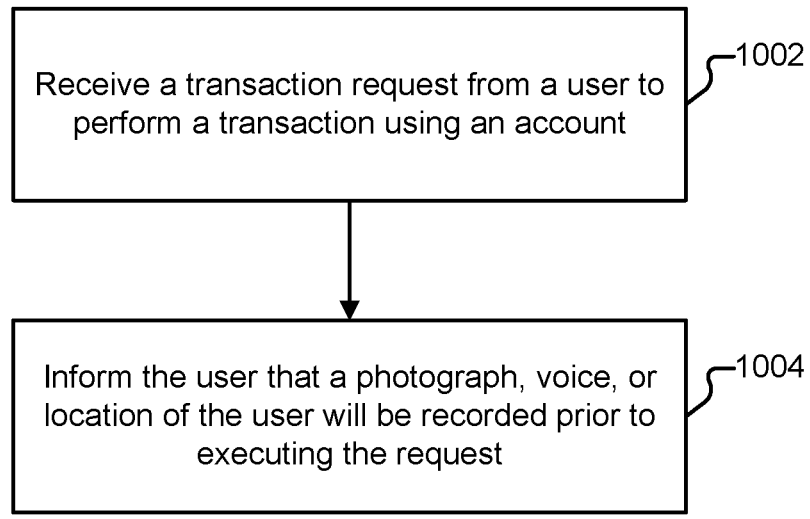
FIG. 10 illustrates an embodiment of a process for reducing fraud.

FIG. 10 illustrates an embodiment of a process for reducing fraud. In some embodiments, the process shown in FIG. 10 is performed on a device such as device 110. The process begins at 1002 when a request to perform a transaction using an account is received from a user. As one example, at 1002, Alice has selected a "buy now" icon in an interface rendered on device 110. At 1004, the user is informed that at least one of a photograph, a voice, and a location of the user will be taken prior to executing the request. As one example, at 904, Alice is informed that her voice will be recorded after she selects box 506.

Additional Detail

Additional information about various aspects of the techniques described herein is provided below.

Transaction Images

Figure 11A:
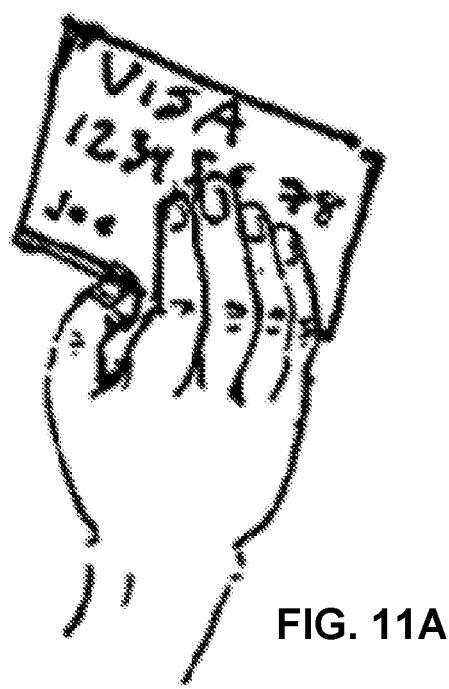
FIG. 11A illustrates an example of a transaction icon.
Figure 11B:
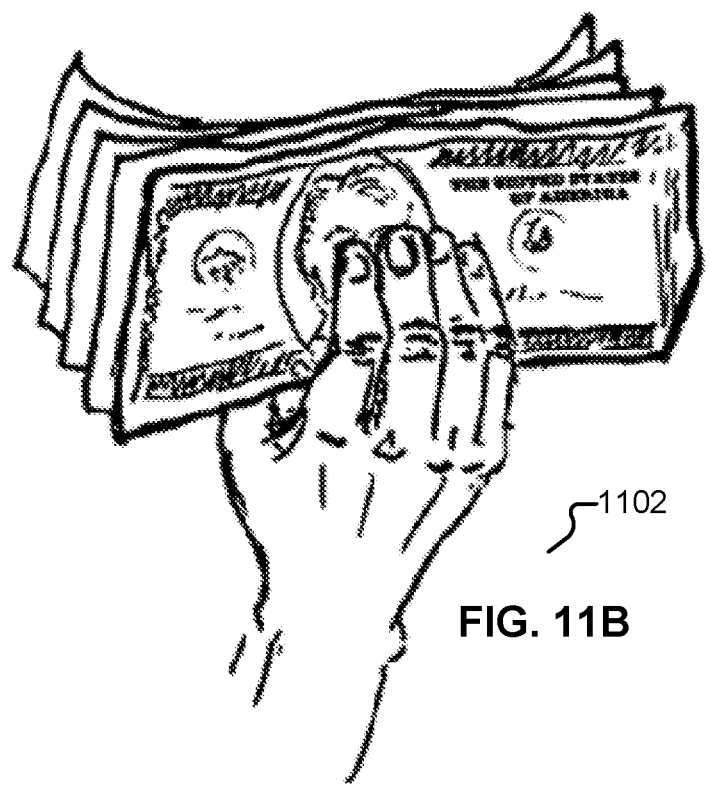
FIG. 11B illustrates an example of a transaction icon.

Illustrated in FIGS. 11A and 11B are additional examples of a transaction icon (e.g., hand 408). In FIG. 11A, Bob's credit card is depicted instead of a bill. In FIG. 11B, the amount of money held by the hand corresponds to the amount of money implicated by the transaction. In various embodiments, which transaction icon is selected occurs automatically, e.g., based on a payment method selected as part of a previous step in a checkout process. The person initiating a transaction can also be presented with a selection of different hands (e.g., one holding a Visa credit card and one holding an American Express credit card) and asked which card to use for payment.

Other transaction icons can also be used, such as those depicting only the money or credit card (without a hand), or textual labels, such as "$39.99." In such cases, the process described in conjunction with FIG. 4 could still be employed. For example, if, instead of dragging hand 408, Bob Jr. had to drag a box labeled "$55.93," Bob Jr. would likely still feel more guilt than if he was presented with a traditional checkout screen. For example, he would still see Bob's face 412, and would still be "dragging" money away from Bob. In addition, the account owner (Bob) could be labeled with a tag stating how much funds he has in his account, how much more funds he has approved for Bob Jr. to use for textbooks, how much he permits for monthly expenses, or another appropriate amount. This tag could change as a result of the transaction. In some embodiments "BEFORE" and "AFTER" labels are applied—showing how much Bob had in his account (or otherwise available funds) before and after Bob Jr.'s transaction occurs, or what the "after" result would be if Bob Jr. was to finalize the transaction.

Transaction icons that do not depict currency or other forms of payment can also be used in conjunction with the techniques described herein. Examples include images of keys, or other indicators of access.

Destination Images

In some embodiments, instead of dragging hand 408 to payment box 410, the user is asked to drag the hand to a box indicating shipping preferences, such as how quickly an item should be delivered (e.g., overnight shipping vs. ground shipping), by which carrier an item should be shipped, and/or other appropriate selections, such as whether to pay the full amount now or over a period of three months, and whether the purchases should be gift wrapped. If multiple options are desired (e.g., "(1) gift wrap and (2) ship via carrier A (3) using 3-day shipping"), the user can be asked to drag the transaction representation from one desired option to the next.

In some cases, such as where a user is transferring money to an individual (instead of, e.g., paying a company such as online retailer 124), an image of the individual to whom money is being transferred is displayed as a destination image, if available. For example, if Alice uses payment service 128 to transfer money to Charlie, in some embodiments, as part of the process, Alice would be presented with a user interface showing image 502 (as the source image), an appropriate hand, such as hand 1102 (as the transaction image), and image 504 (as the destination image). Alice would be instructed to drag money (e.g., by clicking on hand 1102) from herself to Charlie (and/or to a hand included in the representation of Charlie) to complete the transaction. Charlie's image may be available to payment service 128 because Charlie has specifically provided it for that purpose. Payment service 128 may also scrape or otherwise obtain an image for Charlie from other sources, such as a social networking site. This would deter fraud, but also avoids mistakes by Alice, such as one where she pays her cousin Charlie instead of her boyfriend Charlie.

Multiple Source Images

Figure 2C:
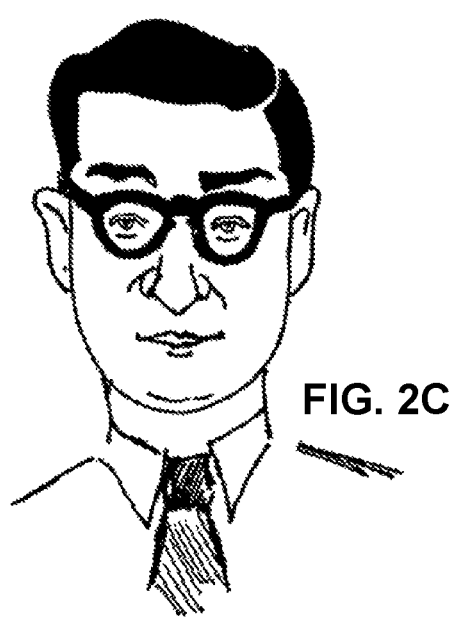
FIG. 2C illustrates an image of an individual.

As explained in conjunction with the descriptions of FIGS. 2A-2C, in some embodiments an account owner provides multiple source images. One reason is as follows. Suppose Bob has registered multiple credit cards with online retailer 124. Bob's employer has issued Bob a company credit card to use for work-related purchases. Accordingly, one of the credit cards he registers with online retailer 124 is the company-issued credit card. Bob also registers one or more personal credit cards. When Bob (or someone using Bob's account) selects a given credit card as the payment type to be used, an image of Bob associated with that card will be shown (e.g., as face 412). If Bob Jr. attempts to buy items from online retailer 124 using Bob's company-issued credit card, not only will he be reminded that he is taking money from Bob—he will be reminded that he is taking money from Bob's company-issued credit card, possibly subjecting Bob to problems with his employer. This may act as a better deterrent than if a more generic version of Bob was presented, irrespective of which payment method is selected. As another example, being presented with the image shown in FIG. 2C may act as a deterrent to Bob himself using the company-issued card for personal purchases, while not impeding his ability to use the card for legitimate purchases.

Attribution

In various embodiments, the techniques described herein are used to attribute a non-fraudulent purchaser. As one example, suppose device 104 is used by three different roommates. The device may be configured with three different payment types (e.g., one for each roommate), or may make use of a single account (e.g., resulting in a monthly bill). In some embodiments, when renting a movie, as part of the checkout purchase, the would-be renter is presented with a graphical representation of each of the three roommates and asked to select which roommate is renting the particular movie.

Audio Output

In some embodiments, a confirmation of a transaction that is about to take place is outputted by the device being used to perform the transaction. As one example, prior to the completion of the purchase by Bob Jr. of books using Bob's account with online retailer 124, a message could be generated that states, "you are about to complete a purchase using Bob's credit card." As another example, when one user attempts to pay another user via an application provided by payment service 128, as part of the transaction, the application could generate, as audio output: "You are about to take $50 from Alice's checking account and give it to Bob Jones. If you do not wish to do this, press escape now."

As another example, the techniques described herein can be used in conjunction with interactive voice response (IVR) systems. Suppose a user is purchasing a ticket to a sporting event using an IVR system and a credit card. As part of the checkout process, the user is asked to speak the name on the credit card. Prior to completion of the transaction, the user's recorded voice is played back to the user as part of a confirmation, such as: "to confirm, you are about to charge Joe Smith's credit card for $40," where "Joe Smith" is the user's recorded voice and the remainder of the sentence is generated by the IVR system. The output would both demonstrate to a fraudster that the voice has been recorded, and remind the fraudster that a real individual—Joe Smith—will be harmed by a fraudulent transaction.

Changing Non-Fraudulent Behaviors

In various embodiments, users are able to configure rules (e.g., with online banking site 130) or with one or more applications installed on the device (including an NFC payment application) to help a legitimate user of the device conform his or her behavior to a desired goal, using the techniques described herein. As one example, Alice may desire to spend a maximum amount of money each month on digital music or ringtones. As another example, Alice may wish to save a certain amount of money each month toward a vacation. In various embodiments, happy versions or unhappy versions of the user will be displayed as part of the transaction. Examples of such versions are shown in FIGS. 5B and 5C, respectively.

In various embodiments, the destination image indicates a value statement of the funds transfer, such as a trash can for a payment for ringtones (where the user has identified the transaction previously as not beneficial), an indicator of how much money Alice has spent this month on ringtones, or an image of a purpose like a beach umbrella (symbolizing transfer of money to a savings account for savings towards a vacation). In some embodiments, the selection of these images is performed automatically, according to account types, payment amounts, names of payees, account balances, past purchases, and other contextual information.

Additional Actions

In some embodiments, users are asked to answer one or more questions or are asked to solve a simple puzzle. Such additional actions will require a small amount of additional time per transaction (e.g., 5 seconds) and thus not interfere with the convenience of a legitimate transaction. In the case of a fraudulent transaction, however, the additional few seconds required to complete the transaction may pose a sufficient amount of time for the fraudster to reconsider whether or not he wishes to proceed with the transaction.

Different types of actions can be required for completion of a transaction depending on factors, such as the size and type of the transaction, history of other transactions, user preferences, account balances, and/or other context. The merchant, payment provider, or other entity may require different actions for different types of payments, different contexts, and different users. For example, a given user may have to say "Yes, I agree to pay these charges" for one type of transaction, but "Pay" for another transaction. Instructions of what to say may be provided on the screen, or may be known to the user only.

Gaming Console with Camera

Figure 12A:
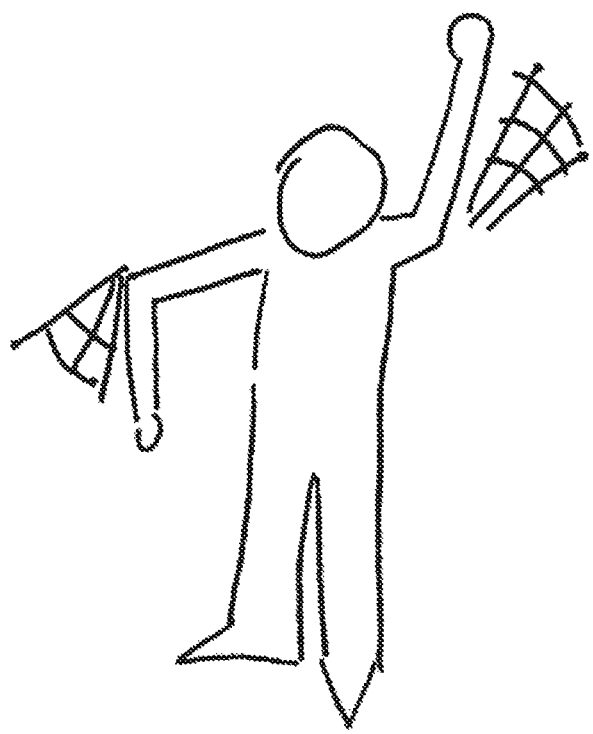
FIG. 12A illustrates an example of a motion performed by a user of a gaming console.
Figure 12B:
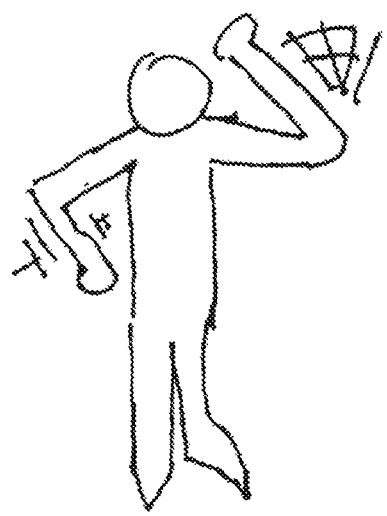
FIG. 12B illustrates an example of a motion performed by a user of a gaming console.

Suppose that in order to perform a transaction (e.g., transferring a digital item from one user to another) on gaming console 108, the transferring user is required to perform a customized action, pre-selected by the user, in front of a camera that is integrated with the gaming console. Illustrated in FIG. 12A is an example of a user ("David") performing the selected action, such as as part of an enrollment process. At a later point, David's younger brother ("Edgar") attempts to steal a digital item from David by impersonating him, as illustrated in FIG. 12B. Edgar performs the action incorrectly, thus indicating that a fraudulent transaction is potentially taking place. In various embodiments, an alert is generated, such as by emailing David an image of Edgar performing the action. For privacy reasons, instead of emailing the image, a general description of the body performing the action could also be provided, such as "an individual 42 inches tall and approximately 100 lbs." As another example, even if Edgar were to perform the correct action, the fact that his size and proportions are different from those of David can be used to generate an alert.

NFC Payments

As explained above, some devices such as telephony device 110 include NFC capabilities. In some embodiments, the techniques described herein are adapted for use in conjunction with a payment scenario using NFC technology. As one example, an application installed on device 110 may be configured to facilitate the use of device 110 in making NFC payments. As part of an NFC transaction, the application could display Alice's face 502 on the screen of mobile device 110, reminding someone paying with the device that the device belongs to Alice. As with other embodiments described above, completion of the transaction could be made contingent on the holder of device 110 dragging a representation of money, stating "I agree to pay" out loud, or taking any other appropriate action, such as those described above.

As another example, the point of sale terminal supporting NFC capabilities may incorporate the techniques described herein. For example, as part of a transaction, the point of sale terminal could be configured to state the name of the account holder out loud, increasing the risk of detection of fraudulent transactions. For example, if Bob attempts to pay with Alice's phone, the point of sale terminal might say out loud, "Please confirm you would like to pay, Alice." If the point of sale terminal is integrated with other infrastructure, such as a database holding user images, Alice's image can be displayed on the terminal as part of the transaction—reminding Bob that he is stealing from Alice (unless he is performing a transaction with Alice's phone with her permission).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
rendering, in one or more interfaces, a virtual likeness of a face associated with an account holder, wherein the virtual likeness of the face was selected by the account holder as part of an enrollment;
subsequent to an interaction by a user with an icon rendered in the one or more interfaces:
capture contextual information comprising location data usable to determine a physical location associated with the user; and
capture a set of biometric information, wherein capturing the set of biometric information comprises capturing, using a camera, a set of images; and
facilitate a fraud detection analysis to determine whether to allow an electronic transaction associated with the account holder to proceed based at least in part on:
the physical location associated with the user determined using the captured location data; and
an analysis of the set of captured biometric information comprising a determination of whether the user is alive based at least in part on an analysis of the set of images captured using the camera; and
a memory coupled to the one or more processors and configured to provide the processor with instructions.

2. The system recited in claim 1, wherein the account holder comprises a recipient of the electronic transaction, and wherein the electronic transaction comprises a payment from the user to the account holder.

3. The system recited in claim 1, wherein the icon represents a form of payment.

4. The system recited in claim 1, wherein the image comprises at least one of a photograph or an avatar.

5. The system recited in claim 1, wherein the one or more interfaces are associated with at least one of a phone, a tablet device, or a laptop.

6. A method, comprising:
rendering, in one or more interfaces, a virtual likeness of a face associated with an account holder, wherein the virtual likeness of the face was selected by the account holder as part of an enrollment;
subsequent to an interaction by a user with an icon rendered in the one or more interfaces:
capturing contextual information comprising location data usable to determine a physical location associated with the user; and
capturing a set of biometric information, wherein capturing the set of biometric information comprises capturing, using a camera, a set of images; and
facilitating a fraud detection analysis to determine whether to allow an electronic transaction associated with the account holder to proceed based at least in part on:
the physical location associated with the user determined using the captured location data; and
an analysis of the set of captured biometric information comprising a determination of whether the user is alive based at least in part on an analysis of the set of images captured using the camera.

7. The method of claim 6, wherein the account holder comprises a recipient of the electronic transaction, and wherein the electronic transaction comprises a payment from the user to the account holder.

8. The method of claim 6, wherein the icon represents a form of payment.

9. The method of claim 6, wherein the image comprises at least one of a photograph or an avatar.

10. The method of claim 6, wherein the one or more interfaces are associated with at least one of a phone, a tablet device, or a laptop.

11. A computer program product embodied in a non-transitory computer readable storage medium and comprising computer instructions for:
rendering, in one or more interfaces, a virtual likeness of a face associated with an account holder, wherein the virtual likeness of the face was selected by the account holder as part of an enrollment;
subsequent to an interaction by a user with an icon rendered in the one or more interfaces:
capturing contextual information comprising location data usable to determine a physical location associated with the user; and
capturing a set of biometric information, wherein capturing the set of biometric information comprises capturing, using a camera, a set of images; and
facilitating a fraud detection analysis to determine whether to allow an electronic transaction associated with the account holder to proceed based at least in part on:
the physical location associated with the user determined using the captured location data; and
an analysis of the set of captured biometric information comprising a determination of whether the user is alive based at least in part on an analysis of the set of images captured using the camera.

12. The system recited in claim 1, wherein the analysis of the set of images captured using the camera further comprises determining whether a face is detected in the captured set of images.

13. The system recited in claim 1, wherein the analysis of the set of images captured using the camera further comprises determining whether a threshold amount of flesh tone is present in the captured set of images.

14. The system recited in claim 1, wherein the set of images comprises a plurality of images successively captured using the camera.

15. The system recited in claim 1, wherein the set of captured biometric information further comprises an audio sample.

16. The system recited in claim 15, wherein facilitating the fraud detection analysis to determine whether the electronic transaction associated with the account holder is allowed to proceed is further based at least in part on a determination of whether the audio sample matches a previously recorded voice sample.

17. The system recited in claim 16, wherein the determination of whether the audio sample matches the previously recorded voice sample is based at least in part on performing a Fast Fourier Transform.

18. The method of claim 6, wherein the analysis of the set of images captured using the camera further comprises determining whether a face is detected in the captured set of images.

19. The method of claim 6, wherein the analysis of the set of images captured using the camera further comprises determining whether a threshold amount of flesh tone is present in the captured set of images.

20. The method of claim 6, wherein the set of images comprises a plurality of images successively captured using the camera.

21. The method of claim 6, wherein the set of captured biometric information further comprises an audio sample.

22. The method of claim 21, wherein facilitating the fraud detection analysis to determine whether the electronic transaction associated with the account holder is allowed to proceed is further based at least in part on a determination of whether the audio sample matches a previously recorded voice sample.

23. The method of claim 22, wherein the determination of whether the audio sample matches the previously recorded voice sample is based at least in part on performing a Fast Fourier Transform.

* * * * *